(12) United States Patent
Beaulieu et al.

(10) Patent No.: US 6,182,554 B1
(45) Date of Patent: Feb. 6, 2001

(54) BEVERAGE FILTER CARTRIDGE HOLDER

(75) Inventors: Roderick H. Beaulieu, Cumberland, RI (US); James W. Wuertele, North Billerica, MA (US); Richard P. Sweeney, Winchester, MA (US); John E. Sylvan, Milton, MA (US); Michael G. Woram, Brooklyn, NY (US); Kenneth A. Focht, Needham; Jennie Kwo, Cambridge, both of MA (US)

(73) Assignee: Keurig, Inc., Wakefield, MA (US)

( * ) Notice: Under 35 U.S.C. 154(b), the term of this patent shall be extended for 0 days.

(21) Appl. No.: 09/475,398

(22) Filed: Dec. 30, 1999

Related U.S. Application Data

(63) Continuation of application No. 09/232,993, filed on Jan. 19, 1999, now Pat. No. 6,079,315.

(51) Int. Cl.[7] ................................................. A47J 31/00
(52) U.S. Cl. ........................ 99/289 R; 99/295; 99/302 R
(58) Field of Search ............................... 99/289 R, 295, 99/302 R, 303

(56) References Cited

U.S. PATENT DOCUMENTS

| | | | |
|---|---|---|---|
| 3,470,812 | * 10/1969 | Levinson | 99/295 |
| 3,478,670 | 11/1969 | Fuqua | 99/283 |
| 3,713,377 | * 1/1973 | Arnett et al. | 99/295 X |
| 3,754,463 | * 8/1973 | Vernooy | 99/295 |
| 4,644,855 | 2/1987 | Woolman et al. | 99/280 |
| 4,823,685 | 4/1989 | Boumans et al. | 99/287 |
| 4,967,647 | 11/1990 | King | 99/280 |
| 5,083,504 | 1/1992 | Koga et al. | 99/302 R |
| 5,297,472 | 3/1994 | Suzuki et al. | 99/289 T |
| 5,325,765 | 7/1994 | Sylvan et al. | 99/295 |
| 5,353,692 | 10/1994 | Reese et al. | 99/289 T |
| 5,840,189 | 11/1998 | Sylvan et al. | 210/474 |
| 5,897,899 | * 4/1999 | Fond | 99/295 X |

OTHER PUBLICATIONS

Stan McLean, VKI Technologies; Mechanical Desktop application: Zuma Brewer; World Wide Web, www.autodesk.com/prodsol/mech/spotlite/zuma3.htm.

* cited by examiner

Primary Examiner—Reginald L. Alexander
(74) Attorney, Agent, or Firm—Samuels, Gauthier & Stevens, LLP

(57) ABSTRACT

A cup shaped holder is internally provided with an ejection mechanism which serves to automatically dislodge a spent beverage cartridge from an upwardly extending piercing member when the lid is opened at the end of a brewing cycle. In addition, the holder is mounted on externally protruding trunnions for pivotal movement between an upright brewing position and a partially inverted position to eject the dislodged cartridge from the holder into an underlying receptacle. The lid has a dependency arm that coacts with a pawl on the holder trunnions to automatically manipulate the holder to eject the cartridge.

22 Claims, 6 Drawing Sheets

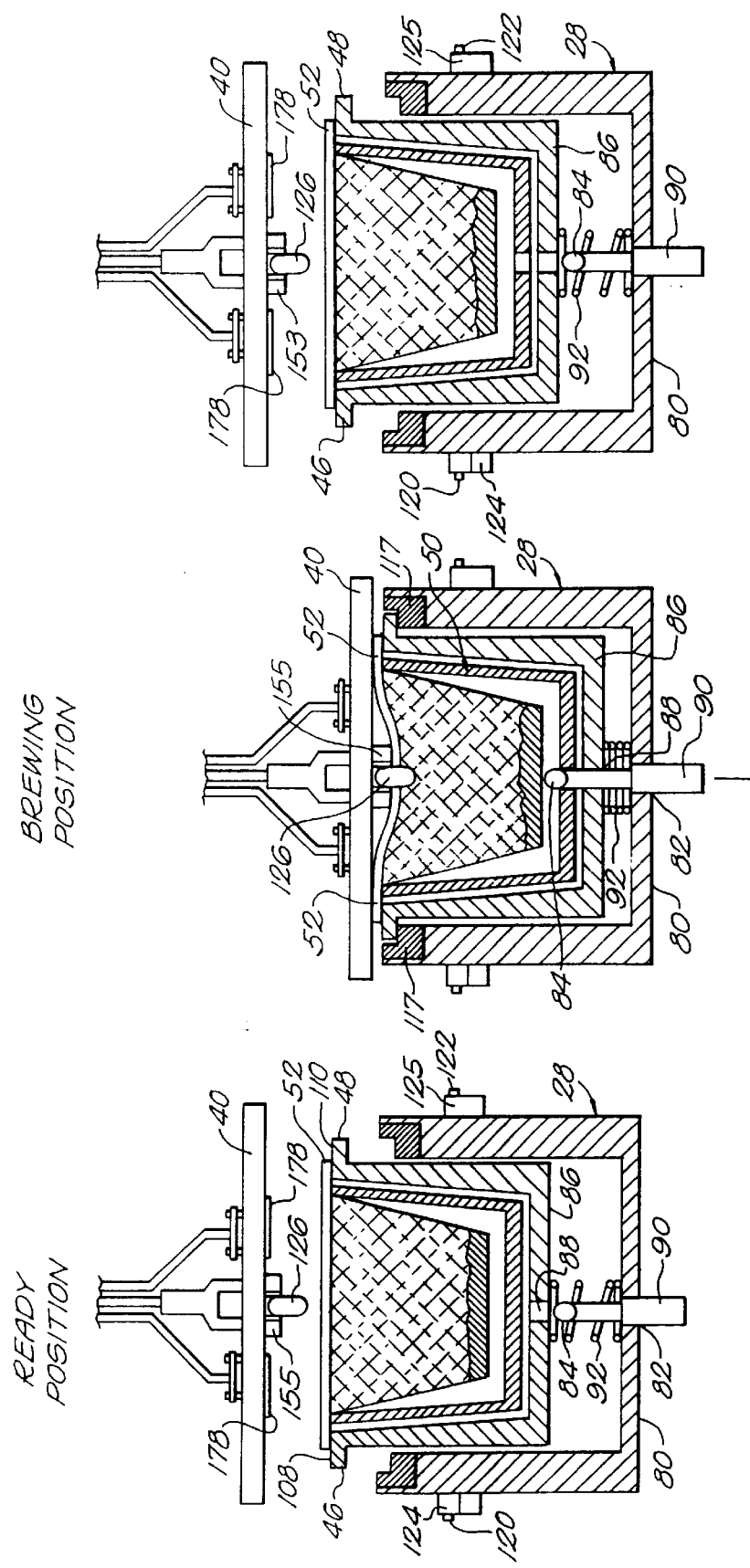

BEVERAGE FILTER CARTRIDGE HOLDER

CROSS REFERENCE TO RELATED APPLICATIONS

This application contains subject matter that relates to the following applications filed evendate herewith, identified as Ser. No. 09/232,994 entitled "Automated Beverage Brewing System" and Ser. No. 09/233,272 entitled "Apparatus for Consecutively Dispensing an Equal Volume of Liquid", both hereby incorporated by reference. This application is a continuation of Ser. No. 09/232,993 filed Jan. 19, 1999, now U.S. Pat. No. 6,079,315.

BACKGROUND OF THE INVENTION

This invention relates to brewers for brewing hot beverages from extracts contained in hermetically sealed disposable cartridges of the type described in U.S. Pat. No. 5,840,189 entitled "Beverage Filter Cartridge", assigned of record to the assignee of the present invention, the disclosure of which is herein incorporated by reference. As disclosed in this patent, the cartridge is placed in a cup shaped housing which is then closed by a vertically adjustable lid. The lid and housing are provided respectively with upper and lower apertured probes which pierce the top and bottom of the cartridge to establish a liquid flow path therethrough during the brewing cycle. At the completion of the brewing cycle, the lid is raised, and the spent cartridge is manually removed and discarded. Removal is sometimes hindered by the lower probe which has a tendency to remain lodged in the bottom of the cartridge.

The present invention improves on the foregoing by providing a mechanism for automatically dislodging and discharging the spent cartridge from the brewer.

SUMMARY OF THE INVENTION

Briefly, the cup shaped holder is internally provided with an ejection mechanism which serves to automatically dislodge a spent beverage cartridge from an upwardly extending piercing member when the lid is opened at the end of a brewing cycle. In addition, the holder is mounted on externally protruding trunnions for pivotal movement between a ready position and a beverage brewing position. The lid as a dependency arm that coacts with a pawl on the holder trunnions to automatically manipulate the holder between its upright and inclined positions. During the transition from the brewing position to the ready position the arm engages the pawl causing the cartridge to be discharged from the holder.

In one embodiment, the holder comprises a base surface that includes a base opening coaxial with the upwardly extending hollow piercing member secured to the base surface, and a slidable cartridge platform having a bore formed therein coaxial with the upwardly extending piercing member to allow the hollow piercing member to extend through the slidable cartridge platform. The holder also includes a cartridge ejection arm having a first axial end connected with the slidable cartridge platform and a second axial end, and a sidewall extending axially away from the base surface and including an interior surface that defines a chamber sized to receive the cartridge. The interior surface includes a guide channel that engages the cartridge ejection arm allowing the slidable cartridge platform to axially move within the chamber. A resilient member is located between the base surface and the slidable cartridge platform. When the cartridge is placed into the holder, a radially outwardly protruding lip of the cartridge rests on the second axial end of the cartridge ejection arm, and when a axial positioning force is applied to the radially outwardly protruding lip, the slidable cartridge platform moves downward causing the hollow piercing member to extend through the bore and pierce a bottom surface of the cartridge to provide an exit flow path for a brewed beverage through the base opening.

The resilient member is preferably a spring of sufficient size, such that, when the axial positioning force is removed, the resilient member causes the cartridge to withdraw from the hollow piercing member. The sidewall may shaped cylindrically or as a truncated cone.

To discharge the cartridge from the holder, the sidewall includes an exterior surface that comprises a pair of radially outwardly extending trunnions that pivotally support the holder. In addition, the holder may include a first pawl attached to the sidewall, wherein the first pawl is engaged to cause the cartridge holder to quickly pivot about the pair of radially outwardly extending trunnions and discharge the cartridge from the chamber.

The cartridge holder cooperates with an axially moveable lid, which is drivenly manipulated between the ready position and the beverage brewing position. In the ready position the axially moveable lid is located a spaced distance above the holder. In the beverage brewing position the lid applies the axial positioning force to the radially downwardly protruding lip of the cartridge, causing the hollow piercing member to penetrate the bottom surface of the cartridge. The lid includes an axially downward projecting apertured probe that pierces a cover of the cartridge to establish an entry flow path for liquid (e.g., hot water) into the cartridge.

The lid cooperates with at a least one downwardly projecting pivot positioning arm that controls the orientation of the cartridge holder about the radially outwardly extending trunnions that pivotally support the holder. The downwardly projecting pivot positioning arm engages the first pawl to cause the cartridge holder to pivot about the pair of radially outwardly extending trunnions and discharge the cartridge from the chamber.

These and other objects, features and advantages of the present invention will become apparent in light of the following detailed description of preferred embodiments thereof, as illustrated in the accompanying drawings.

BRIEF DESCRIPTION OF THE DRAWINGS

FIGS. 6A–6C are simplified cross sectional front views of the cartridge holder and the lid in various operational positions.

DETAILED DESCRIPTION OF THE INVENTION

Figure 1:
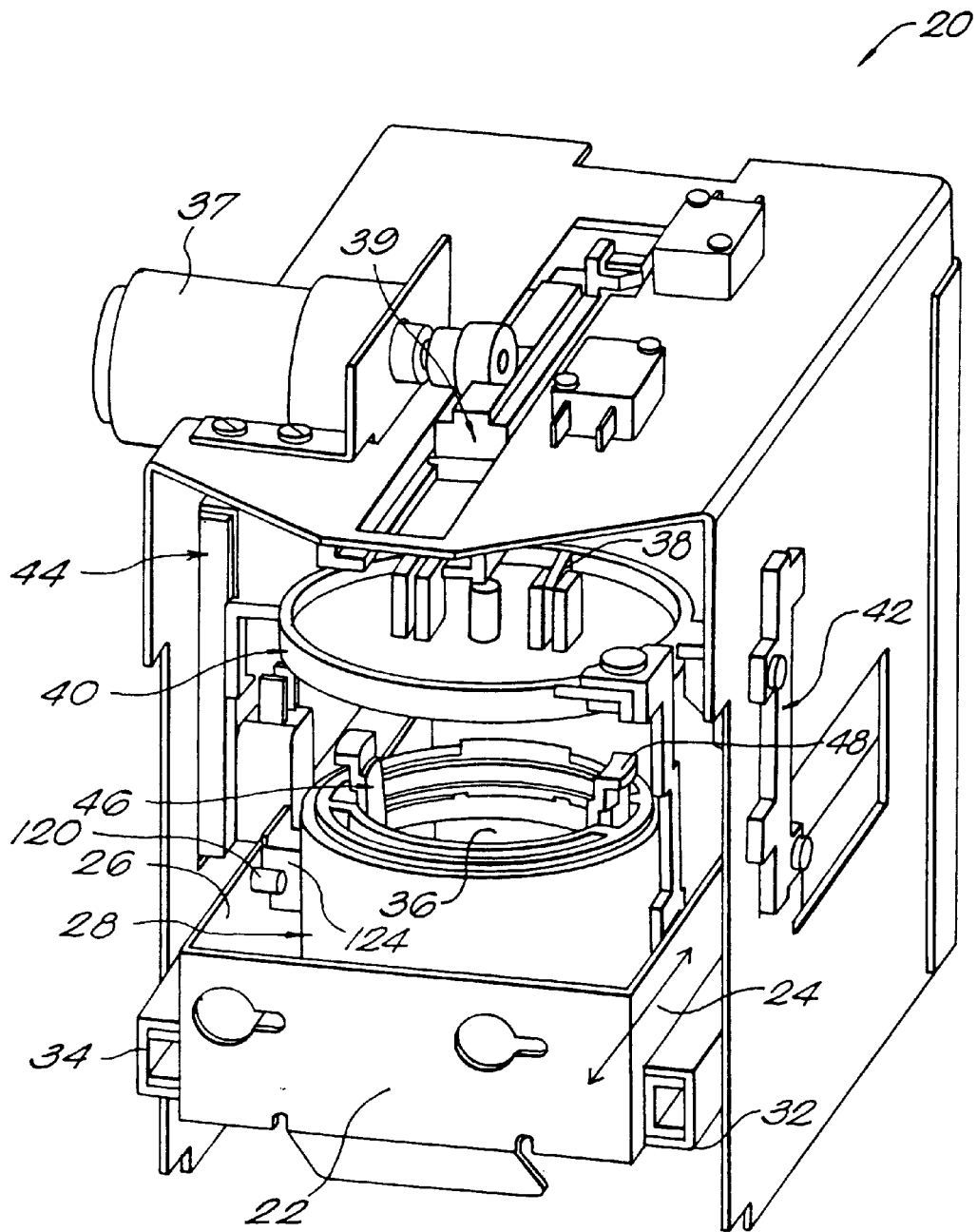
FIG. 1 is a pictorial illustration of a beverage brewing system.

FIG. 1 is a pictorial illustration of a beverage brewing system 20. The system 20 includes a slidable drawer 22 comprising side panels 24, 26 that each include a mounting hole (not shown), which together pivotally mount a beverage filter cartridge holder 28 to the slidable drawer 22. The drawer 22 slides along track assembles 32, 34.

The system 20 also includes an axially moveable lid 40 that is manipulated by a linkage yoke 38 (partially shown), driven by an electric motor 37 through a pinion driven rack 39. The lid 40 is axially guided along vertical side tracks 42, 44 between a ready position and a beverage brewing position. In the ready position the lid 40 is axially positioned above and separated from the cartridge holder 28, assuming of course that the slidable drawer 22 is in the closed position. The holder 28 includes a chamber 36, and cartridge ejection arms 46, 48 that support and position a beverage cartridge within the holder.

FIG. 2A is a side view of the cartridge holder 28 and the lid 40. As shown, a beverage cartridge 50 (preferably disposable) has been inserted into the cartridge holder 28 to brew beverages from extracts (e.g., coffee, tea, powders and concentrates) contained in disposable hermetically sealed cartridges. A preferred beverage cartridge is disclosed in U.S. Pat. No. 5,840,189, which is assigned to the assignee of the present invention and hereby incorporated by reference.

Figure 3:
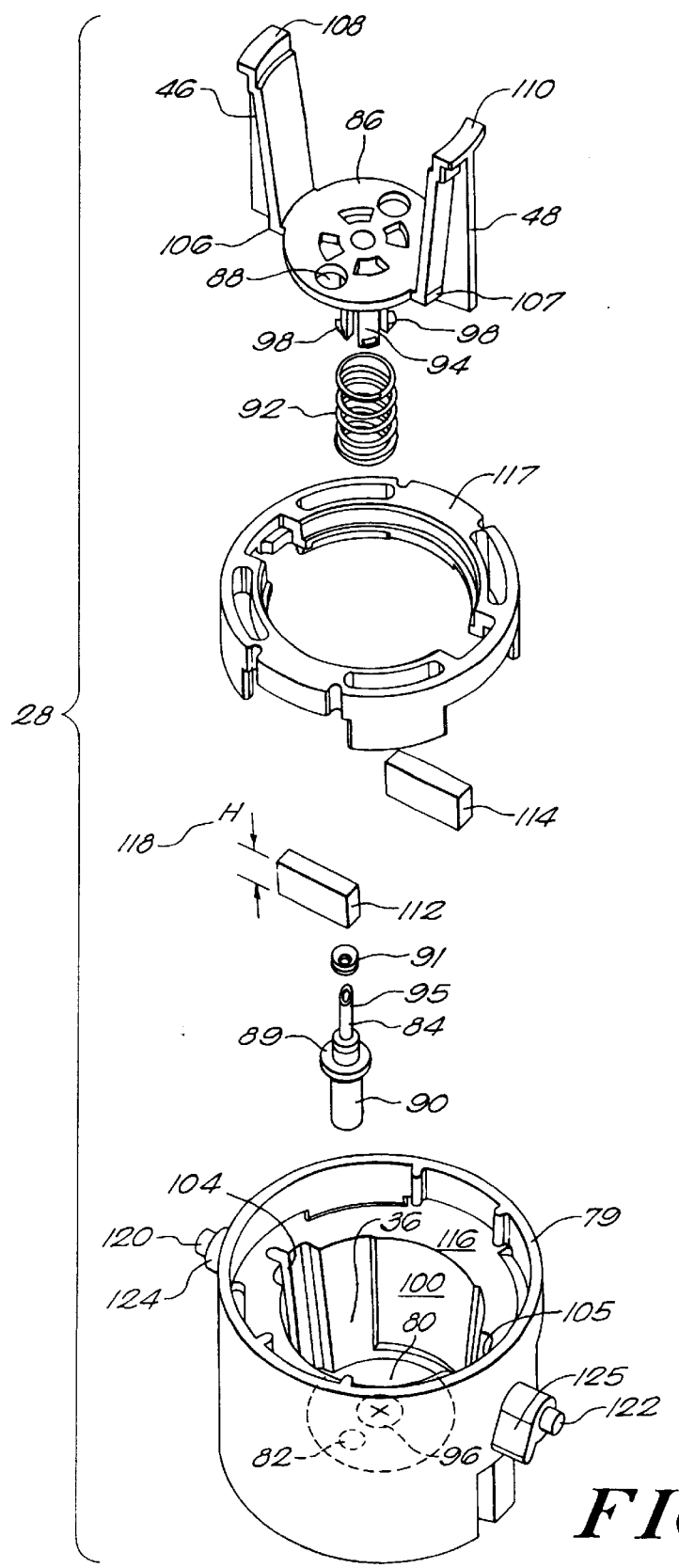
FIG. 3 is an assembly drawing of the cartridge holder.

FIG. 3 is an assembly drawing of the cartridge holder 28. The holder 28 comprises a housing 79 having a circular base surface 80 that includes a base opening 82 coaxial with an upwardly extending hollow piercing member 84 secured to the base surface 80. A slidable cartridge platform 86 having a bore 88 formed therein is coaxial with the upwardly extending piercing member 84, which allows the member 84 to extend through the slidable cartridge platform 86. The hollow piercing member 84 includes a circular lip 89 that is bonded to the periphery of the base opening 82, and an outwardly extending conduit 90 that passes through the base opening 82 and extends below the base surface 80. The outwardly extending conduit 90 includes an internal flow passage that acts as a diffuser to reduce the velocity of the liquid exiting the conduit. A seal 91 is snuggly slipped over the hollow piercing member 84 to prevent leakage around the circular lip 89. The hollow piercing member 84 also includes a cross hole 95 through which liquid can also enter the hollow piercing member 84.

A resilient member 92 is operatively located between the base surface 80 and the slidable cartridge platform 86. Axial positioning members 94 attached to the slidable cartridge platform 86 pass through the resilient member 92 and through an aperture 96 centered in the base surface 80. The positioning members 94 include radial projections 98, which retain the positioning members 94 within the aperture 96 and the slidable cartridge platform within the housing.

The housing 79 also includes a sidewall 100 extending axially from the base surface 80 to define the chamber 36 that is sized to receive the cartridge 50 (FIG. 2A). The sidewall 100 may be shaped cylindrically or as a truncated cone to closely match the shape of the cartridge. The sidewall 100 includes first and second guide channels 104, 105 that engage the cartridge ejection arms 46, 48 respectively, allowing the slidable cartridge platform 86 to axially move within the chamber 36. The cartridge ejection arms 46, 48 include first axial ends 106, 107 connected to the slidable cartridge platform 86, and second axial end surfaces 108, 110 that contact and support the radially outwardly protruding lip 52 (FIG. 2A) of the cartridge 50 (FIG. 2A).

The holder 28 also includes force absorbing members 112, 114 (e.g., made of rubber) that rest on a plateau 116 of the sidewall 100 and support a compliance ring 117. The absorbing members 112, 114 have a height H dimension 118 that positions the upper rim of the compliance ring slightly above the housing 79 when no force is being applied to the ring. The function of the force absorbing members 112, 115 and the compliance ring 117 shall be discussed hereinafter.

The housing further comprises a pair of radially outwardly extending trunnions 120, 122 that pivotally support the holder 28, and pawls 124, 125 that are used to position the holder about the axis extending through the trunnions 120, 122.

Figure 4:
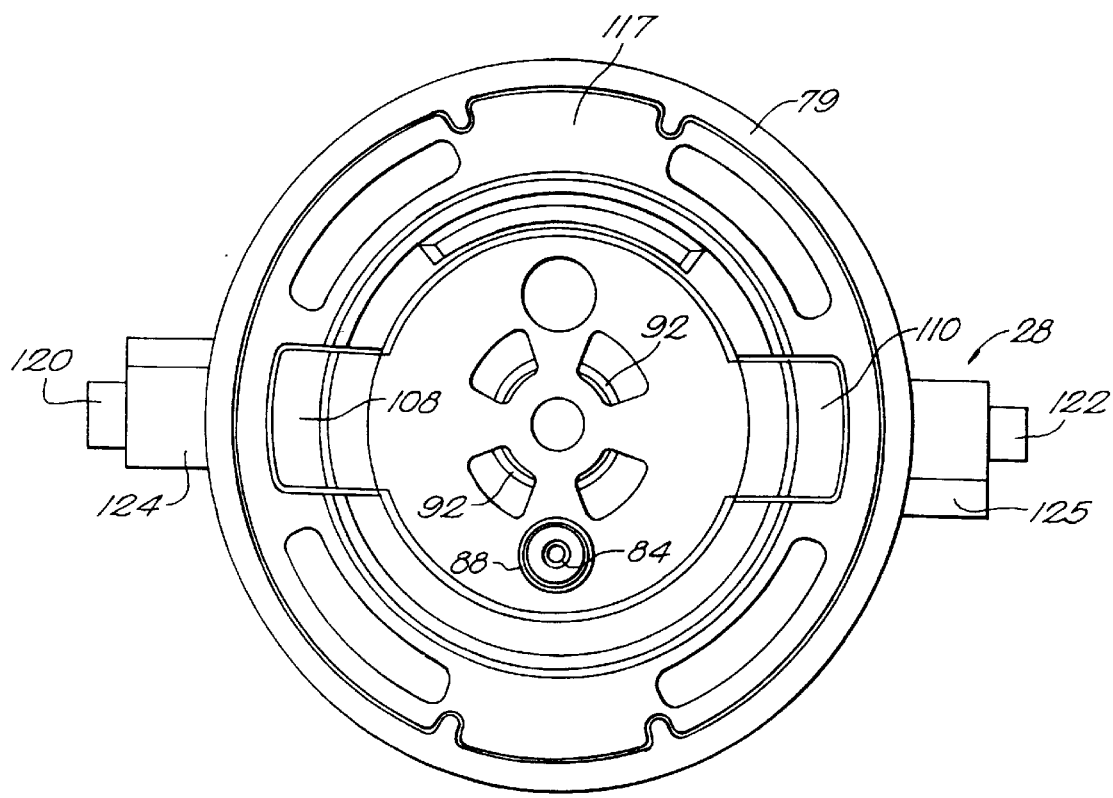
FIG. 4 is a top view of the cartridge holder.
Figure 5:
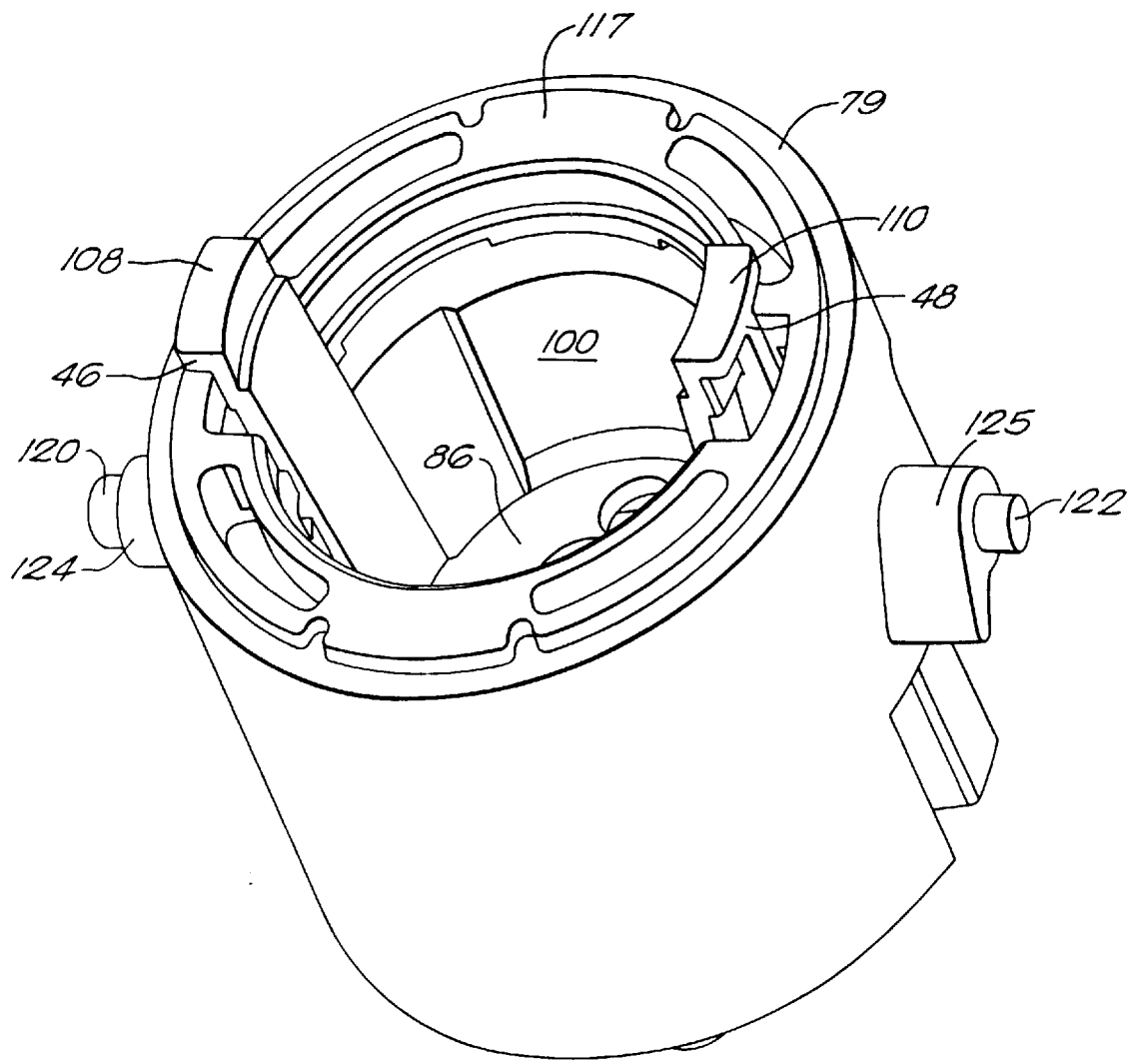
FIG. 5 is an isometric view of the cartridge holder.

FIG. 4 is a top view of the cartridge holder 28. FIG. 5 is an isometric view of the cartridge holder 28.

Figure 2:
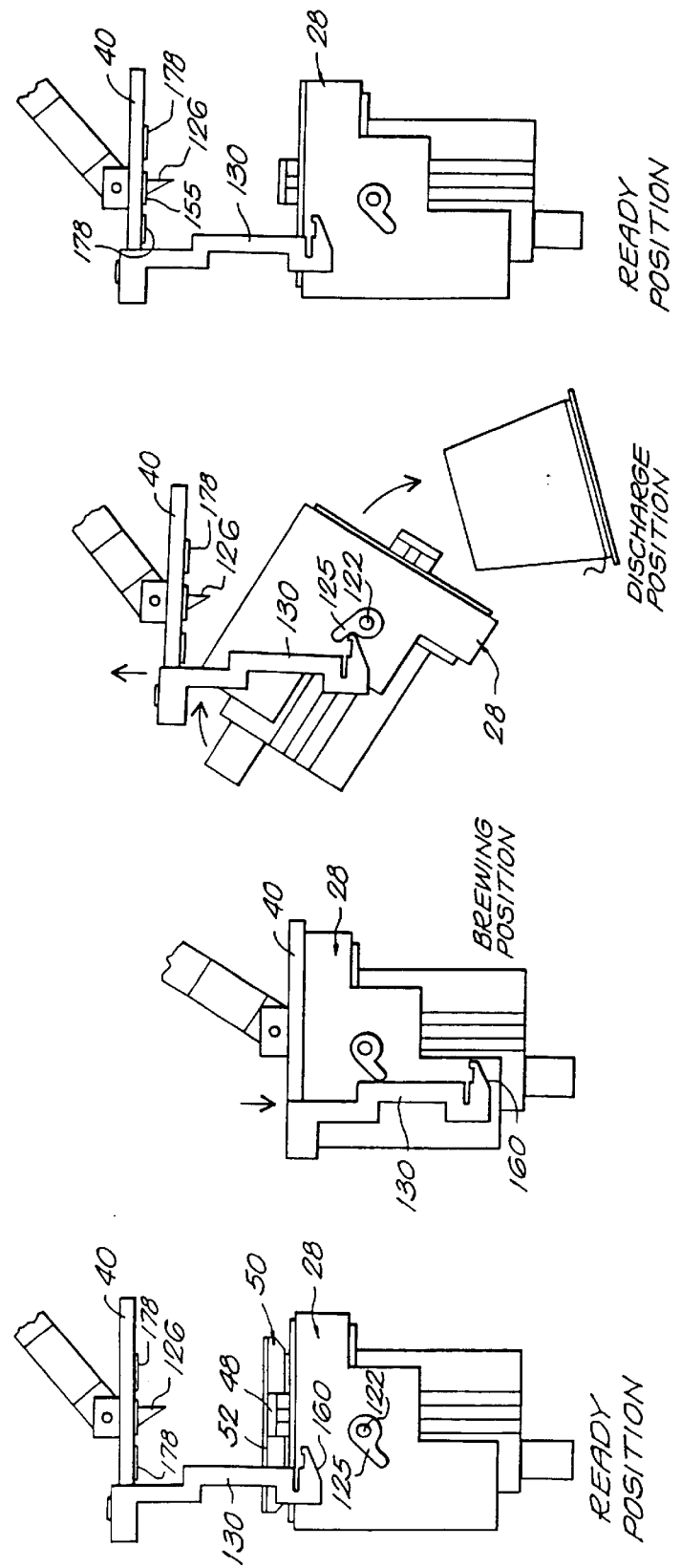
FIGS. 2A–2D are side views of the cartridge holder and the lid in various operational positions.

FIG. 6A is a simplified cross sectional front view with the beverage cartridge 50 inserted into the holder 28 and the lid 40 in the ready position (note the resilient member 92 is in the expanded position). FIG. 2A is a side view of the cartridge holder 28 populated with the cartridge 50 and the lid 40 in the ready position. Referring to FIGS. 2A and FIG. 6A, the radially outwardly protruding lip 52 (FIG. 2) of the cartridge 50 rests on the second axial end surfaces 108, 110 of the cartridge ejection arms 46, 48 respectively. Notably, the lid 40 is positioned a spaced distance above the holder 28 and as a result the resilient member 84 is in the relaxed (i.e., expanded) position.

As the lid 40 moves from the ready position (FIGS. 2A and 6A) axially downward to the beverage brewing position (FIGS. 2B and 6B), an inclined surface 160 of a downward projecting pivot arm 130 that is attached to the lid contacts the pawl 125. The pivot arm 130 and its inclined surface 160 are preferably a flexible plastic allowing the pivot arm to bend slightly away as the surface 160 slides downwardly against the pawl. As the lid continues axially downward the inclined surface passes below the pawl 125 and the pivot arm flexes back. The lid then applies an axial positioning force to the radially outwardly protruding lip 52 of the cartridge 50, moving the slidable cartridge platform 86 deeper into the chamber and compressing the resilient member 92. The force applied by the lid 40 causes a downwardly projecting apertured probe 126 to pierce the top of the cartridge 50 establishing a flow inlet that provides a liquid (e.g., hot water) to the interior of the cartridge. The force applied by the lid also causes the hollow piercing member 84 to extend through the bore 88 and pierce a bottom surface of the cartridge, to provide an exit flow path for a brewed beverage through the slidable cartridge platform 86 and the base surface 80. The compliance ring 117 and the force absorbing members 112, 114 (FIG. 3) are used to compensate for dimensional offsets and tolerances in the holder and the cartridge.

When a predetermined amount of liquid has been delivered through the cartridge 50 to provide the brewed beverage, the lid 40 begins to move axially upward allowing the resilient member 92 to expand. Significantly, referring to FIG. 6C, the resilient member 92 is preferably a spiral spring of sufficient size, such that, when the axial positioning force applied by the lid 40 is removed, the resilient member 92 causes the slidable cartridge platform 86 to move axially upward to withdraw the cartridge 50 from the hollow piercing member 84. FIG. 6C illustrates a transitional lid position as the lid moves from the brewing position to the ready position, illustrating the cartridge withdrawn from the hollow piercing member 84. Significantly, as the lid moves upward the resilient member 92 expands causing the slidable cartridge platform 86 to move axially upward withdrawing the cartridge 50 from the hollow piercing member 84.

Referring to FIG. 2C, the lid includes a downward projecting pivot arm 130 that engages the underside of the pawl 125 as the lid moves to the ready position. Specifically, as the lid axially moves from the brewing position to the ready position the pivot arm contacts the underside of the pawl 125 causing the holder to rapidly rotate about the trunnions. The other pawl 124 cooperates with stops (not shown) located on the sidewall 26 (FIG. 1) to limit the pivotal movement of the holder between the upright position and discharge positions (e.g., about 135 degrees of rotation). As the holder rapidly rotates, the pawl 124 strikes one of the stops abruptly stopping the rotation of the holder and ejecting the cartridge. Advantageously, this automatically discharges the cartridge from the holder upon the completion of the brewing cycle. As the lid continues moving upward to the ready position, the pivot arm 130 disengages from the pawl 125 and allows the empty cartridge holder to pivot about the trunnions back to the upright position, as shown in FIG. 2D. To ensure the lid 40 separates from the top of the cartridge 50, a plurality of projections 178 are located on the underside of the lid 140. For example, the projections 178 may radially extend from the center of the underside of the lid. A foam gasket 155 also assists in separating the lid 40 from the top of the cartridge 50.

To brew another beverage, the drawer 22 (FIG. 1) is opened and a new cartridge is inserted into the holder.

Although the present invention has been shown and described with respect to several preferred embodiments thereof, various changes, omissions and additions to the form and detail thereof, may be made therein, without departing from the spirit and scope of the invention.

What is claimed is:

1. A chamber for a cartridge containing a beverage extract, said chamber comprising:
    a housing having a sidewall and a bottom wall with an upwardly projecting apertured probe defining a liquid outlet;
    a platform overlying said bottom wall, said platform having an opening aligned with said apertured probe and being provided with an upwardly extending ejection arm, said platform being movable between a raised position at which said platform wall is above said probe and said ejection arm projects above said housing, and a lowered position at which said probe projects through said opening in said platform and said ejection arm is retracted into said housing, said housing being configured and dimensioned to receive the cartridge with the cartridge mounted for movement in unison with said ejection arm;
    means for resiliently urging said platform into said raised position;
    a lid overlaying said housing, said lid having a downwardly projecting apertured probe defining a liquid inlet; and
    means for manipulating said lid between a ready position spaced above said housing, and a beverage brewing position where said lid applies a positioning force urging the cartridge and said platform downwardly, causing said downwardly and upwardly projecting apertured probes to pierce the cartridge and place said liquid inlet in communication with said liquid outlet via the interior of the cartridge.

2. The chamber of claim 1, wherein said means for manipulating further comprises means for moving said lid from said beverage brewing position to a discharge position that discharges the cartridge from said chamber.

3. The chamber of claim 2, wherein said means for resiliently urging includes a spring of sufficient size such that when said lid is positioned to remove the positioning force, said spring moves said platform to the raised position causing the cartridge to withdraw from said upwardly projecting apertured probe.

4. The chamber of claim 3, wherein
   A) said housing sidewall comprises:
      i) an exterior surface that includes a pair of radially outwardly extending trunnions that pivotally support said chamber;
      ii) a first pawl attached to said housing sidewall, wherein said first pawl is engaged to cause said housing to pivot about said pair of radially outwardly extending trunnions and discharge the cartridge from said chamber;
      iii) a second pawl attached to said sidewall, wherein said second pawl is engaged to limit the rotational travel of said chamber about said trunnions; and
   B) said lid further comprises means for engaging said first and second pawls to pivot said chamber in order to discharge the cartridge from said chamber.

5. A beverage filter cartridge holder that receives a beverage filter cartridge containing a beverage extract, and positions and pierces the cartridge establishing a liquid flow path through the extract to provide a brewed beverage, said beverage filter cartridge holder comprising:
    a base surface that includes a base opening coaxial with an upwardly extending hollow piercing member secured to said base surface;
    a slidable cartridge platform having a bore formed therein coaxial with said hollow piercing member to allow said hollow piercing member to pass through said slidable cartridge platform;
    a spring located between said base surface and said slidable cartridge platform;
    a cartridge ejection arm having a first axial end connected with said slidable cartridge platform and a second axial end; and
    a sidewall extending axially from said base surface and including an interior surface that defines a chamber sized to receive the beverage filter cartridge, wherein said interior surface includes a channeled axial passage that engages said cartridge ejection arm allowing said slidable cartridge platform to axially move deeper into said holder in response to a positioning force,
    wherein when the beverage filter cartridge is placed into said beverage filter cartridge holder, a radially outwardly protruding lip of the beverage filter cartridge rests on said second axial end of said cartridge ejection arm extending axially outside said beverage filter cartridge holder, and when the positioning force is applied to the radially outwardly protruding lip against said spring, said slidable cartridge platform moves downward causing said hollow piercing member to extend through said bore and pierce a bottom surface of the beverage filter cartridge to provide an exit flow path for the brewed beverage through said base opening.

6. The beverage filter cartridge holder of claim 5, wherein said spring is of sufficient size such that when the positioning force is removed, said spring causes said hollow piercing member to be removed from the beverage filter cartridge.

7. The beverage filter cartridge holder of claim 6, wherein said bore and said hollow piercing member are co-axial.

8. The beverage filter cartridge holder of claim 6, further comprising a second cartridge ejection arm having a base axial end connected with said slidable cartridge platform and a distant axial end extending outside said beverage filter cartridge holder a distance equal to said cartridge ejection arm, wherein said second cartridge ejection arm cooperates with said cartridge ejection arm to position the beverage filter cartridge.

9. The beverage filter cartridge holder of claim 6, wherein said spring is spiral and coaxial with said base surface and said slidable cartridge platform.

10. The beverage filter cartridge holder of claim 6, wherein said sidewall includes an exterior surface that comprises a pair of radially outwardly extending trunnions that pivotally support said beverage filter cartridge holder.

11. The beverage filter cartridge holder of claim 10, further comprising a first pawl attached to said sidewall, wherein said first pawl is engaged to cause said beverage filter cartridge holder to pivot about said pair of radially outwardly extending trunnions and discharge the beverage filter cartridge from said beverage filter cartridge holder.

12. The beverage filter cartridge holder of claim 11, further comprising a second pawl attached to said truncated conical sidewall, wherein said second pawl is engaged to limit the rotational travel of the holder about said trunnions.

13. The beverage filter cartridge holder of claim 12, wherein said base surface, said sidewall, said pair of radially outwardly extending trunnions and said first and second pawls are formed from a unitary piece of plastic.

14. A cartridge holder that receives a cartridge containing a beverage extract, and positions and pierces the cartridge to establish a liquid flow path through the beverage extract to provide a brewed beverage, said cartridge holder comprising:
- a base surface that includes a base opening coaxial with an upwardly extending hollow piercing member secured to said base surface;
- a slidable cartridge platform having a bore formed therein coaxial with said upwardly extending piercing member to allow said hollow piercing member to extend through said slidable cartridge platform;
- a cartridge ejection arm having a first axial end connected with said slidable cartridge platform and a second axial end extending outside a chamber;
- a sidewall extending axially from said base surface and including an interior surface that defines said chamber sized to receive the cartridge, wherein said interior surface includes a channeled passage that engages said cartridge ejection arm allowing said slidable cartridge platform to axially move within said chamber; and
- a resilient member located between said base surface and said slidable cartridge platform;
- wherein when the cartridge is placed into said cartridge holder, a radially outwardly protruding lip of the cartridge rests on said second axial end of said cartridge ejection arm.

15. The cartridge holder of claim 14, wherein said resilient member is a spring.

16. The cartridge holder of claim 15, wherein said resilient member is of sufficient size such that when the axial positioning force is removed, said resilient member causes said hollow piercing member to be removed from the cartridge.

17. The cartridge holder of claim 16, wherein said sidewall includes an exterior surface that comprises a pair of radially outwardly extending trunnions that pivotally support said cartridge holder.

18. The cartridge holder of claim 17, further comprising a first pawl attached to said sidewall, wherein said first pawl is engaged to cause said cartridge holder to pivot about said pair of radially outwardly extending trunnions.

19. The cartridge holder of claim 18, further comprising a second pawl attached to said sidewall, wherein said second pawl is engaged to limit the rotational travel of the cartridge holder about said trunnions.

20. The cartridge holder of claim 19, wherein said base surface, said sidewall, said pair of radially outwardly extending trunnions and said first and second pawls are formed from a unitary piece of plastic.

21. The cartridge holder of claim 20, wherein said base surface, said sidewall, said pair of radially outwardly extending trunnions and said first and second pawls are formed from a unitary piece of plastic.

22. The cartridge holder of claim 14, further comprising means for applying an axial positioning force to said second axial end of said cartridge ejection arm that urges said slidable cartridge platform downward causing said hollow piercing member to extend through said bore and pierce a bottom surface of the cartridge to provide an exit flow path for the brewed beverage through said base opening.

* * * * *